(12) United States Patent
Brown et al.

(10) Patent No.: US 11,600,853 B1
(45) Date of Patent: Mar. 7, 2023

(54) SYSTEMS AND METHODS FOR STORING, TRANSPORTING, AND HANDLING OF SOLID-STATE ELECTROLYTES

(71) Applicant: Ampcera Inc., Milpitas, CA (US)

(72) Inventors: James Emery Brown, Tucson, AZ (US); Hui Du, Tucson, AZ (US); Sumin Zhu, San Francisco, CA (US)

(73) Assignee: AMPCERA INC., Milpitas, CA (US)

( * ) Notice: Subject to any disclaimer, the term of this patent is extended or adjusted under 35 U.S.C. 154(b) by 388 days.

(21) Appl. No.: 16/872,902

(22) Filed: May 12, 2020

Related U.S. Application Data

(60) Provisional application No. 62/847,877, filed on May 14, 2019.

(51) Int. Cl.
| | |
|---|---|
| B65D 81/22 | (2006.01) |
| B65D 81/24 | (2006.01) |
| B65B 25/00 | (2006.01) |
| B65B 55/22 | (2006.01) |
| B65B 69/00 | (2006.01) |
| H01M 10/0562 | (2010.01) |

(52) U.S. Cl.
CPC ......... *H01M 10/0562* (2013.01); *B65B 25/00* (2013.01); *B65B 55/22* (2013.01); *B65B 69/0066* (2013.01); *B65D 81/22* (2013.01); *B65D 81/24* (2013.01); *B65B 2220/14* (2013.01); *B65B 2220/16* (2013.01)

(58) Field of Classification Search
CPC ..... B65B 25/00; B65B 55/22; B65B 69/0066; B65B 2220/14; B65B 2220/16; B65D 81/22; B65D 81/24; H01M 10/0562
See application file for complete search history.

(56) References Cited

U.S. PATENT DOCUMENTS

| | | | |
|---|---|---|---|
| 1,692,996 A | * | 11/1928 | Richardson ............. B65B 55/22 252/384 |
| 3,508,994 A | | 4/1970 | Nyrop |

(Continued)

FOREIGN PATENT DOCUMENTS

| | | |
|---|---|---|
| CN | 102718494 A | 10/2012 |
| EP | 0524678 A1 | 1/1993 |

(Continued)

OTHER PUBLICATIONS

Brushett et al.: An All-Organic Non-aqueous Lithium-Ion Redox Flow Battery, Advanced Energy Materials, 2012, vol. 2, pp. 1390-1396.

(Continued)

*Primary Examiner* — Stephen F. Gerrity
(74) *Attorney, Agent, or Firm* — Michael P. Alexander

(57) ABSTRACT

A container assembly includes a container defining a sealed chamber, a solid state electrolyte disposed in the chamber, and a hydrophobic substance protecting the solid state electrolyte. A method for preparing a solid state electrolyte includes positioning a solid state electrolyte in a chamber of a container, protecting the solid state electrolyte using a hydrophobic substance, and sealing the chamber. A method for extracting a solid state electrolyte includes positioning the container assembly of in a dry atmosphere, unsealing the chamber, and removing the solid state electrolyte from the chamber to the dry atmosphere.

20 Claims, 9 Drawing Sheets

(56) References Cited

U.S. PATENT DOCUMENTS

| | | | |
|---|---|---|---|
| 4,255,208 A | 3/1981 | Deutscher et al. | |
| 4,668,593 A | 5/1987 | Sammells | |
| 4,770,908 A | 9/1988 | Mori et al. | |
| 4,846,931 A | 7/1989 | Gmitter et al. | |
| 5,006,247 A | 4/1991 | Dennison et al. | |
| 5,123,538 A * | 6/1992 | Groenewegen | H05K 9/0064 220/592.2 |
| 5,160,618 A | 11/1992 | Burggraaf et al. | |
| 5,215,729 A | 6/1993 | Buxbaum | |
| 5,269,926 A | 12/1993 | Webster et al. | |
| 5,668,188 A | 9/1997 | Whinnery et al. | |
| 6,168,884 B1 * | 1/2001 | Neudecker et al. | H01M 10/0436 429/231.95 |
| 6,352,909 B1 | 3/2002 | Usenko | |
| 6,461,772 B1 | 10/2002 | Miyake et al. | |
| 6,475,661 B1 | 11/2002 | Pellegri et al. | |
| 6,524,736 B1 | 2/2003 | Sompalli et al. | |
| 6,565,632 B1 | 5/2003 | van Hassel | |
| 6,649,559 B2 | 11/2003 | Drost et al. | |
| 6,699,276 B2 | 3/2004 | Sogard et al. | |
| 6,740,604 B2 | 5/2004 | Kelly et al. | |
| 6,974,521 B2 | 12/2005 | Schermer | |
| 7,108,813 B2 | 9/2006 | Kang et al. | |
| 7,125,626 B2 | 10/2006 | Kato | |
| 7,163,713 B2 | 1/2007 | Jacobson et al. | |
| 7,182,894 B2 | 2/2007 | Kumar et al. | |
| 7,316,919 B2 | 1/2008 | Childs et al. | |
| 7,442,303 B2 | 10/2008 | Jacobson | |
| 7,547,393 B2 | 6/2009 | Ramaswamy et al. | |
| 7,588,623 B2 | 9/2009 | Dover et al. | |
| 7,621,979 B2 | 11/2009 | Kaigawa et al. | |
| 7,763,380 B2 | 7/2010 | Morita et al. | |
| 7,767,256 B2 | 8/2010 | Gu et al. | |
| 7,767,257 B2 | 8/2010 | Gu et al. | |
| 7,820,321 B2 | 10/2010 | Horne et al. | |
| 7,867,669 B2 | 1/2011 | Liu et al. | |
| 8,313,968 B2 | 11/2012 | Elgawadi | |
| 8,506,790 B2 | 8/2013 | Balagopal et al. | |
| 8,691,413 B2 | 4/2014 | Esswein et al. | |
| 8,715,392 B2 | 5/2014 | Liu | |
| 8,889,300 B2 | 11/2014 | Bugga et al. | |
| 8,920,925 B2 | 12/2014 | Gadkaree et al. | |
| 9,156,006 B2 | 10/2015 | Yip et al. | |
| 9,300,000 B2 | 3/2016 | Jansen et al. | |
| 9,368,775 B2 | 6/2016 | Visco et al. | |
| 9,419,299 B2 | 8/2016 | Visco et al. | |
| 9,512,041 B2 | 12/2016 | Mcevoy et al. | |
| 9,631,773 B2 | 4/2017 | Gehlhausen et al. | |
| 9,688,463 B2 | 6/2017 | Tuet et al. | |
| 9,724,640 B2 | 8/2017 | Joo et al. | |
| 9,947,963 B2 | 4/2018 | Du et al. | |
| 9,954,229 B2 | 4/2018 | Xiao | |
| 10,079,391 B2 | 9/2018 | Kjeang et al. | |
| 10,088,751 B2 | 10/2018 | Yang et al. | |
| 10,211,481 B2 | 2/2019 | Badding et al. | |
| 2003/0219641 A1 * | 11/2003 | Petillo | H01M 4/92 429/513 |
| 2005/0227455 A1 | 10/2005 | Park et al. | |
| 2006/0025866 A1 | 2/2006 | Serafin et al. | |
| 2007/0087328 A1 | 4/2007 | Sleytr et al. | |
| 2008/0142373 A1 | 6/2008 | Joshi et al. | |
| 2008/0173540 A1 | 7/2008 | Joshi et al. | |
| 2008/0299377 A1 | 12/2008 | Gu et al. | |
| 2009/0000475 A1 | 1/2009 | Fekety et al. | |
| 2009/0035631 A1 | 2/2009 | Zagaja et al. | |
| 2009/0057162 A1 | 3/2009 | Balagopal et al. | |
| 2009/0130477 A1 | 5/2009 | Hou et al. | |
| 2011/0201180 A1 | 8/2011 | Elgawadi | |
| 2011/0223450 A1 | 9/2011 | Horne et al. | |
| 2012/0135278 A1 | 5/2012 | Yoshie et al. | |
| 2013/0011704 A1 | 1/2013 | Horne et al. | |
| 2013/0048509 A1 | 2/2013 | Balagopal et al. | |
| 2013/0095388 A1 * | 4/2013 | Nakamoto | H01M 10/0561 429/304 |
| 2013/0323611 A1 | 12/2013 | Wang et al. | |
| 2014/0363740 A1 * | 12/2014 | Holme et al. | H01G 4/10 429/231.5 |
| 2016/0334699 A1 | 11/2016 | Doi et al. | |
| 2017/0275039 A1 * | 9/2017 | Fischer et al. | C07C 39/08 |
| 2017/0352936 A1 * | 12/2017 | Jin | H01M 12/065 |
| 2019/0181461 A1 | 6/2019 | Weber et al. | |
| 2019/0217252 A1 | 7/2019 | Newbloom et al. | |
| 2020/0243870 A1 * | 7/2020 | Wachsman et al. | H01M 10/0525 |
| 2020/0395630 A1 * | 12/2020 | Yersak et al. | H01M 4/5815 |

FOREIGN PATENT DOCUMENTS

| | | |
|---|---|---|
| EP | 2545984 A1 | 1/2013 |
| GB | 2565070 A | 2/2019 |
| JP | 2013026142 A | 2/2013 |
| WO | 2014053623 A3 | 4/2014 |

OTHER PUBLICATIONS

Chen et al.: Lithium-Organic Nanocomposite Suspension for High-Energy-Density Redox Flow Batteries, ACS Energy Letter, 2018, vol. 3, pp. 1991-1997.

Delmdahl et al.: Large-Area Laser-Lift-Off Processing in Microelectronics, Physics Procedia, 2013, vol. 41, pp. 241-248.

Ding et al.: A High-Performance All-Metallocene-Based, Non-Aqueous Redox Flow Battery, Energy & Environmental Science, 2017, vol. 10, pp. 491-497.

Doughty et al.: Batteries for Large-Scale Stationary Electrical Energy Storage, The Electrochemical Society Interface, 2010, vol. 19, No. 3, pp. 49-53.

Duduta et al.: Semi-Solid Lithium Rechargeable Flow Battery, Advance Energy Materials, 2011, vol. 1, No. 4, pp. 511-516.

Hamelet et al.: Non-Aqueous Li-Based Redox Flow Batteries, Journal of the Electrochemical Society, 2012, vol. 159, No. 8, pp. A1360-A1367.

Jia et al.: High-Energy Density Nonaqueous All Redox Flow Lithium Battery Enabled with a Polymeric Membrane, Science Advances, 2015, vol. 1, No. 10, p. e1500886.

Kouras et al.: Macro-Porous Ceramic Supports for Membranes Prepared from Quartz Sand and Calcite Mixtures, Journal of the European Ceramic Society, 2017, vol. 37, No. 9, pp. P3159-P3165.

Lee et al.: Water-Soluble Epitaxial NaCl Thin Film for Fabrication of Flexible Devices, Scientific Reports, 2017, vol. 7, No. 8716, pp. 1-7.

Liao et al.: A Macro-Porous Graphene Oxide-Based Membrane as a Separator with Enhanced Thermal Stability for High-Safety Lithium-ion Batteries, Royal Society of Chemistry Advances, 2017, vol. 7, No. 36, pp. 22112-22120.

Lobankova et al.: Laser Lift-Off Technique, Modem Technique and Technologies 2012, pp. 26-27.

Placke et al.: Lithium ion, Lithium Metal, and Alternative Rechargeable Battery Technologies: The Odyssey for High Energy Density, Journal of Solid State Electrochemistry, 2017, vol. 21, No. 7, pp. 1939-1964.

Prifti et al.: Membranes for Redox Flow Battery Applications, Membranes, 2012, vol. 2, No. 2, pp. 275-306.

R. Jonson and P. McGinn, Tape Casting and Sintering of Li7La3Zr1.75Nb0.25A10.1O12 with Li3BO3 Additions, Solid State Ionics, 2018, vol. 323, No. 1, pp. 49-55.

Salimi Jazi et al.: Spray-Formed, Metal-Foam Heat Exchangers for High Temperature Applications, Journal of Thermal science and Engineering Applications, 2009, vol. 1, No. 3, pp. 031008 (7 pages).

Skyllas-Kazacos et al.: Progress in Flow Battery Research and Development, Journal of Electrochemical Socity, 2011, vol. 158, No. 8, pp. R55-R79.

G. Soloveichik: Battery Technologies for Large-Scale Stationary Energy Storage, Annual Review of Chemical and Biomolecular Engineering, 2011, vol. 2, pp. 503-527.

(56) References Cited

OTHER PUBLICATIONS

Wang et al.: Li-Redox Flow Batteries Based on Hybrid Electrolytes: At the Cross Road between Li-ion and Redox Flow Batteries, Advance Energy Materials, 2012, vol. 2, No. 7, pp. 770-779.

Wang et al.: Recent Progress in Redox Flow Battery Research and Development, Advance Functional Materials, 2012, vol. 23, No. 8, pp. 1-17.

Weber et al.: Redox Flow Batteries: A Review, Journal of Applied Electrochemistry, 2011, vol. 41, pp. 1137-1164.

Yang et al.: A Membrane-Free Lithium/Polysulfide Semi-Liquid Battery for Large-Scale Energy Storage, Energy & Environmental Science, 2013, vol. 6, pp. 1552-1558.

Yi et al.: Flame Made Nanoparticles Permit Processing of Dense, Flexible, Li+ Conducting Ceramic Electrolyte Thin Films of Cubic-Li7La3Zr2O12 (c-LLZO), Journal of Materials Chemistry A, 2016, vol. 4, No. 33, pp. 12947-12954.

Zhang et al.: Porous Silicon Carbide Ceramics Produced by a Carbon Foam Derived from Mixtures of Mesophase Pitch and Si Particles, Journal of the American Ceramic Society, 2009, vol. 92, No. 1, pp. 260-263.

Zhao et al.: A Chemistry and Material Perspective on Lithium Redox Flow Batteries Towards High-Density Electrical Energy Storage, Chemical Society Reviews, 2015, vol. 44, No. 22, pp. 7968-7996.

Galven et al.: Instability of Lithium Garnets against Moisture. Structural Characterization and Dynamics of Li7-xHxLa3Sn2O12 and Li5-xHxLa3Nb2O12. Chemistry of Materials, 2012, 24, 17, 3335-3345.

Hofstetter et al.: Present Understanding of the Stability of Li-Stuffed Garnets with Moisture, Carbon Dioxide, and Metallic Lithium. Journal of Power Sources 2018, 390, 297-312.

Sharafi et al.: Impact of Air Exposure and Surface Chemistry on Li-Li7La3Zr2O12 Interfacial Resistance. Journal of Materials Chemistry A 2017, 5 (26), 13475-13487.

* cited by examiner

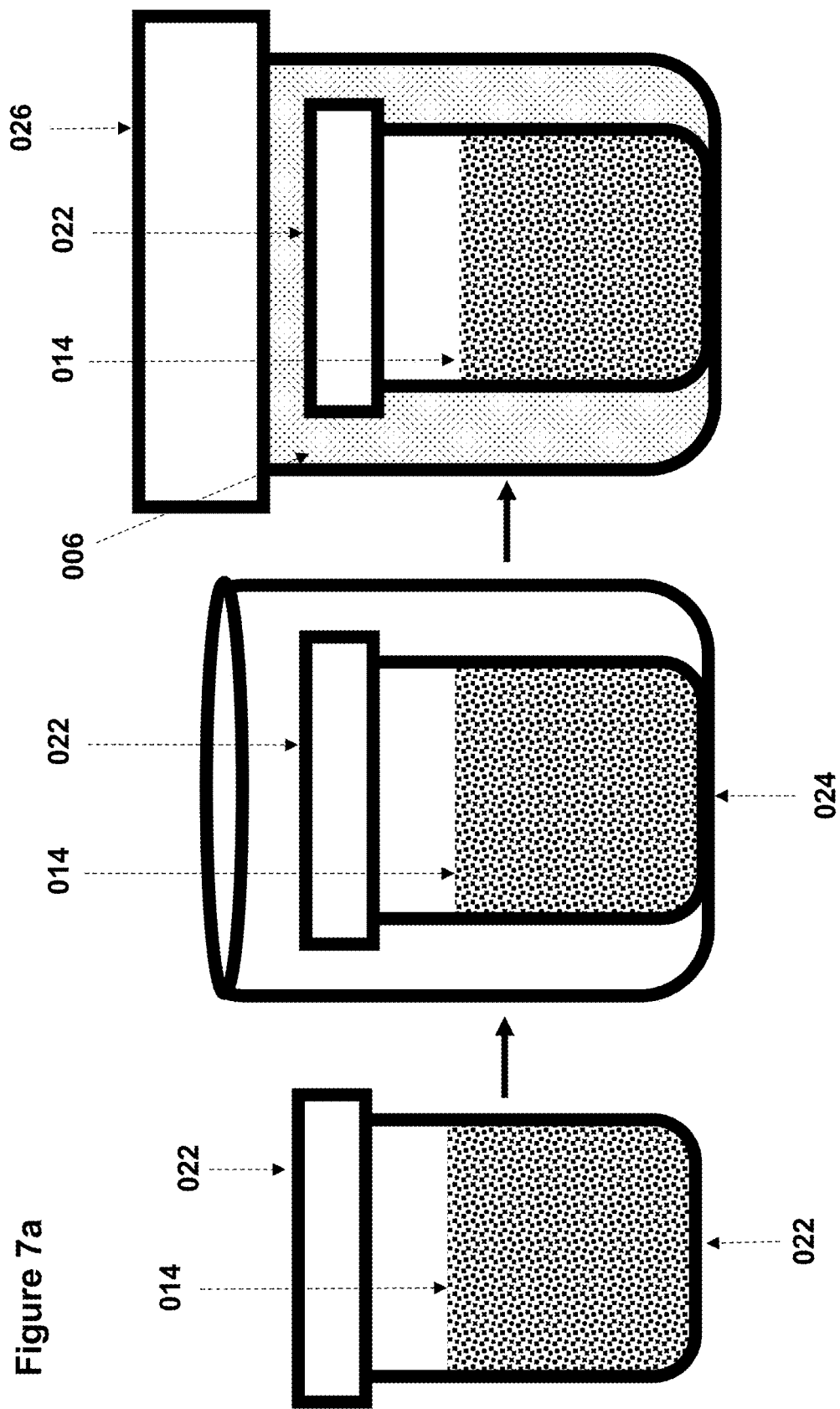

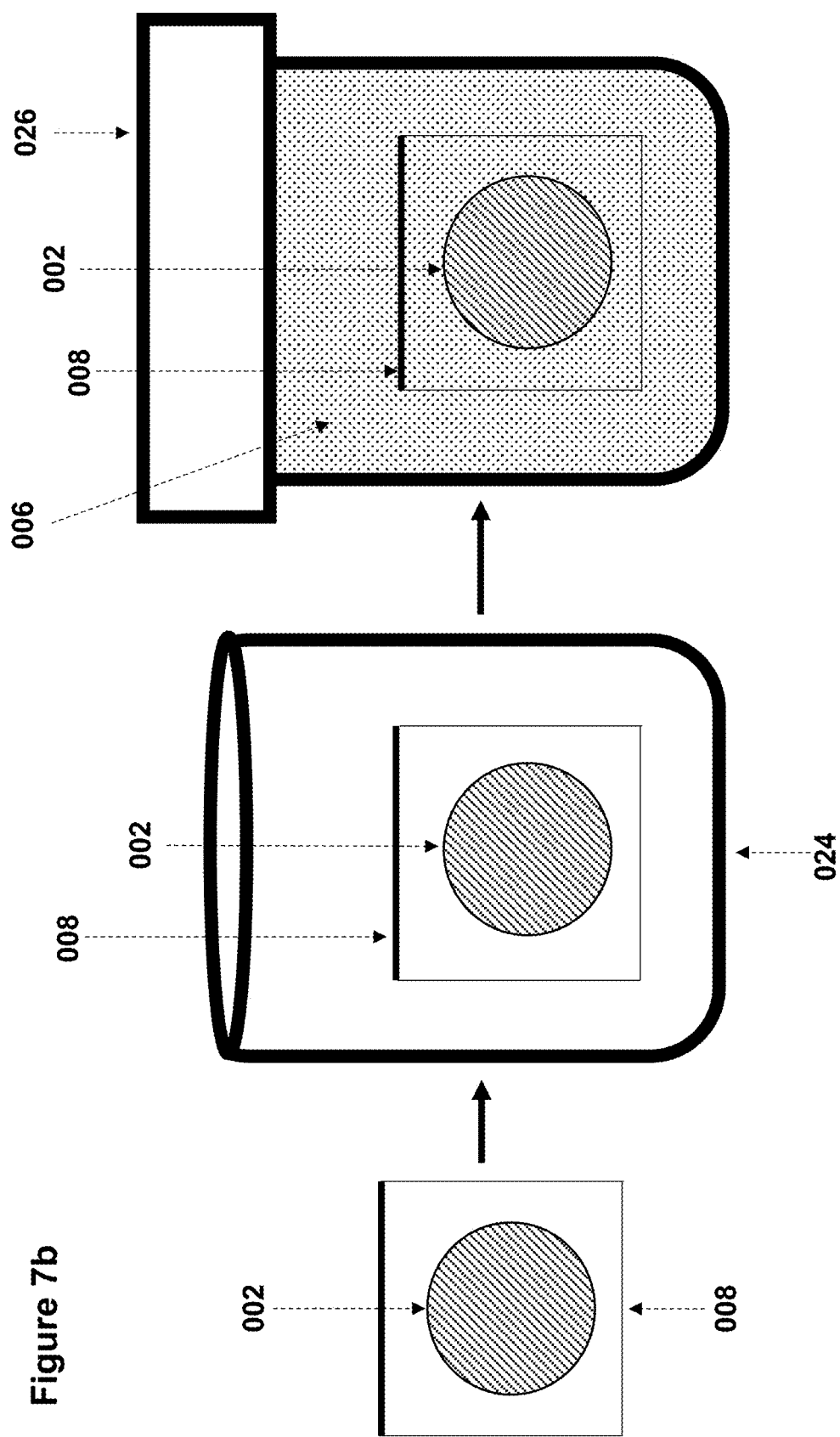

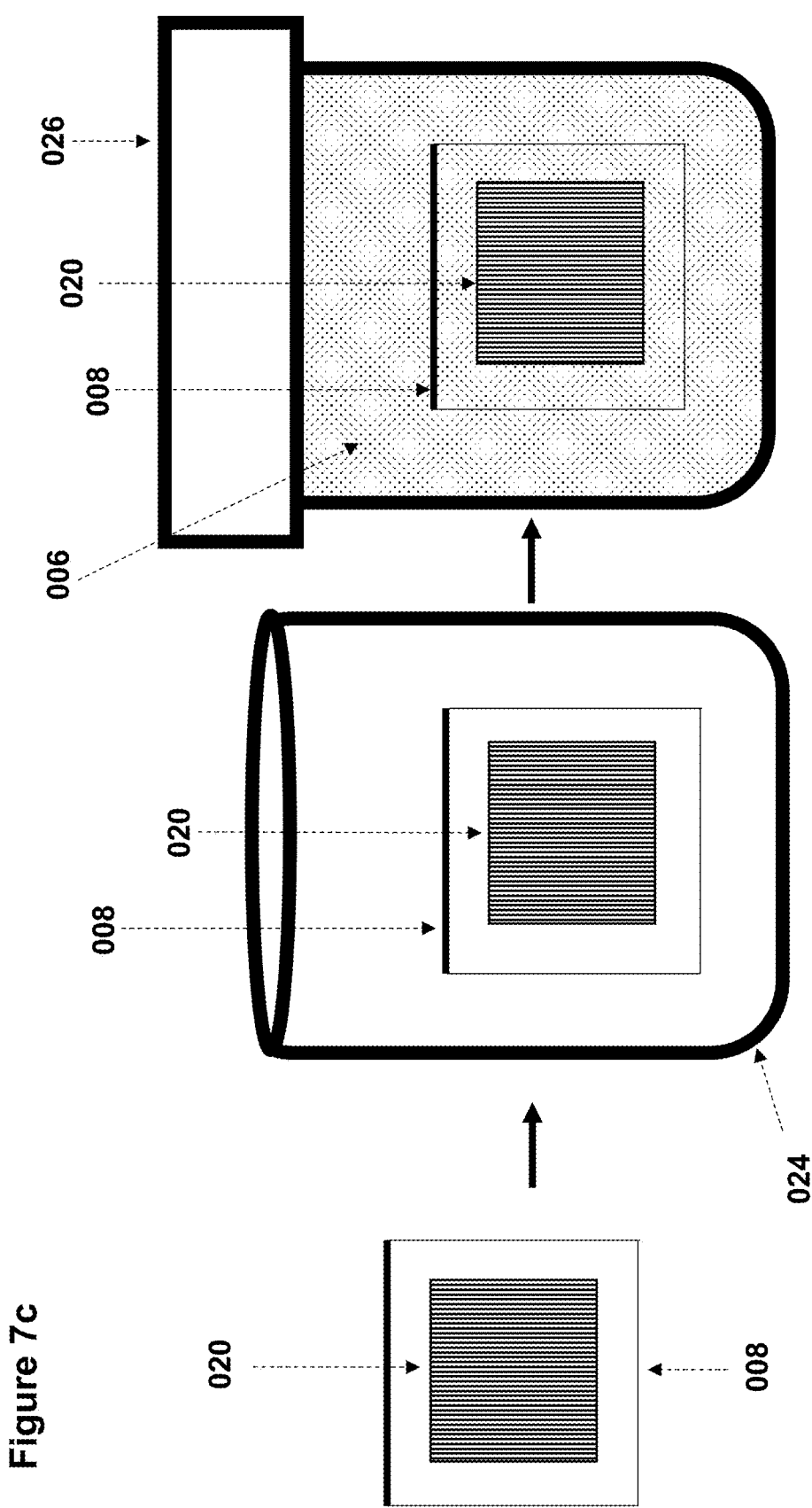

SYSTEMS AND METHODS FOR STORING, TRANSPORTING, AND HANDLING OF SOLID-STATE ELECTROLYTES

PRIORITY

The present invention claims the priority of U.S. Provisional Patent Application No. 62/847,877, filed May 14, 2019, which is incorporated herein by reference in its entirety.

FIELD

The present application relates to the field of systems and methods for storing, transporting, and handling of solid-state electrolytes.

BACKGROUND

Solid-state electrolytes have gained interest in recent years for all-solid-state battery applications. However, most solid-state electrolytes are sensitive to moisture, carbon dioxide and oxygen in the air which can have a negative effect on their performance if exposed thereto. Therefore, measures are needed to be taken to reduce the risk of degradation.

SUMMARY

In one embodiment, a container assembly includes a container defining a sealed chamber, a solid state electrolyte disposed in the chamber, and a hydrophobic substance protecting the solid state electrolyte.

In an aspect, the container may include at least one of a glass petri dish, a plastic petri dish, an envelope, a bag, a jar, a bucket, a drum and a barrel.

In an aspect, the solid state electrolyte may be in the form of at least one of a ceramic membrane, a powder, a thin film and a thin film composite.

In an aspect, the hydrophobic substance may include oil. In another aspect, the hydrophobic substance may include at least one of mineral oil, baby oil, fish oil, olive oil, canola oil, peanut oil, cooking oil, motor oil and almond oil.

In an aspect, the hydrophobic substance may include at least one of hydrophobic and water insoluble organic solvents. In another aspect, the hydrophobic substance may include at least one of acetone, hexane, toluene, pentane, cyclohexane, heptane, benzene, chlorobenzene, carbon tetrachloride, triethyl amine, o-xylene, p-xylene and m-xylene.

In an aspect, the hydrophobic substance may include a hydrophobic compound that is in liquid form when being heated and becomes solid at room temperature. In another aspect, the hydrophobic substance may include wax.

In an aspect, the hydrophobic substance may be disposed in the chamber.

In an aspect, the container may further define an opening to the chamber, and the hydrophobic substance may seal the opening to the chamber.

In an aspect, the container may include a primary container and a secondary container, wherein the solid state electrolyte disposed in the primary container, and wherein the primary container is disposed with the secondary container. In another aspect, the hydrophobic substance may be disposed in the secondary container outside of the primary container. In another aspect, the secondary container may further define an opening, and wherein the hydrophobic substance seals the opening to the secondary container.

In another embodiment, a method for preparing a solid state electrolyte includes positioning a solid state electrolyte in a chamber of a container, protecting the solid state electrolyte using a hydrophobic substance, and sealing the chamber.

In an aspect, the method may include positioning the solid state electrolyte and the container in a dry atmosphere before the step of positioning the solid state electrolyte in the chamber of the container.

In yet another embodiment, a method for extracting a solid state electrolyte includes positioning the container assembly of in a dry atmosphere, unsealing the chamber, and removing the solid state electrolyte from the chamber to the dry atmosphere.

In an aspect, the method may further include separating the hydrophobic substance from the solid state electrolyte. The separation of the hydrophobic substance from the solid state electrolyte may include heating the solid state electrolyte.

Other embodiments of the disclosed systems and methods will become apparent from the following detailed description, the accompanying drawings and the appended claims.

BRIEF DESCRIPTION OF THE DRAWINGS

FIG. 7a: A schematic illustrating the use of a secondary storage and transportation container with hydrophobic substance to protect the primary container with solid-state electrolyte in the form of a powder.

FIG. 7b: A schematic illustrating the use of a secondary storage and transportation container with hydrophobic substance to protect the primary storage and transportation container with a solid-state electrolyte in the form of a dense ceramic membrane.

FIG. 7c: A schematic illustrating the use of a secondary storage and transportation container with hydrophobic substance to protect the primary storage and transportation container with a solid-state electrolyte in the form of a thin film.

DETAILED DESCRIPTION

Figure 1:
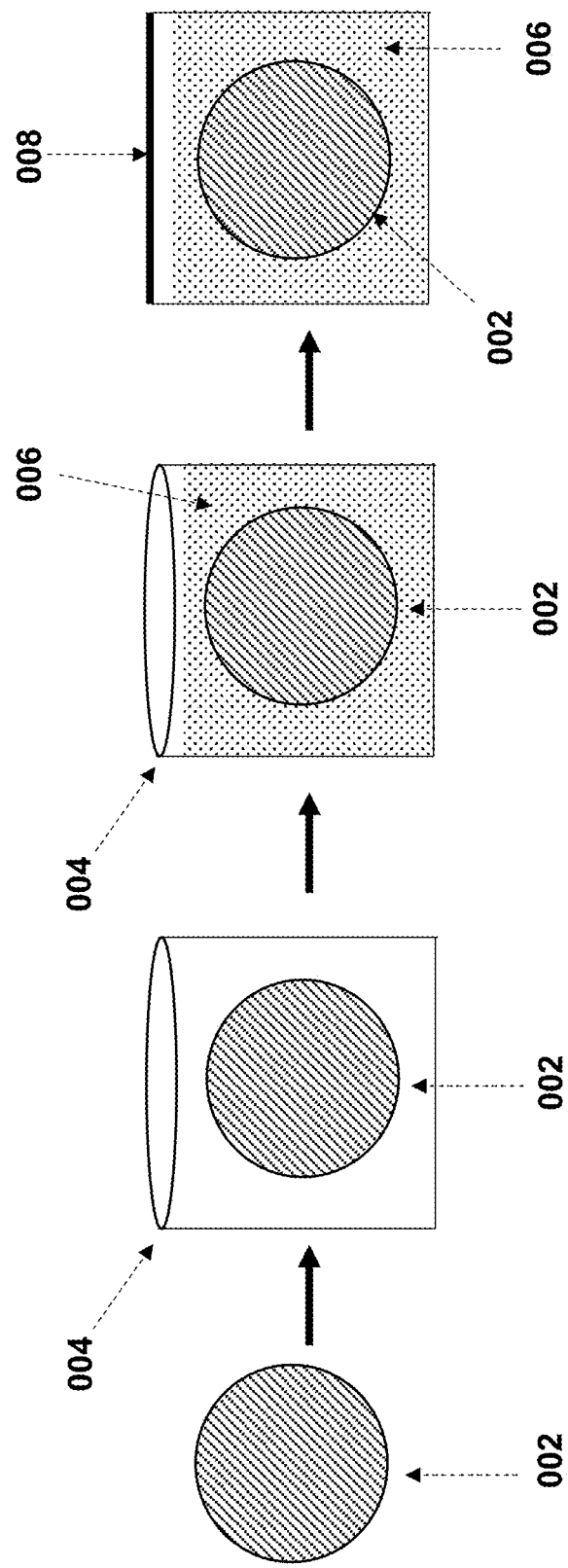
FIG. 1: A schematic illustrating the packaging of a solid-state electrolyte in the form of a dense ceramic membrane inside an envelope filled with a protective hydrophobic substance.

The present disclosure relates to systems and methods for storing, transporting, and handling of solid-state electrolytes using hydrophobic substances.

A solid-state electrolyte includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Mg^{2+}$, $Al^{3+}$, $Zn^{4+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include but not limited to a garnet-like structure oxide material with the general formula:

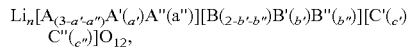

a. where A, A', and A'' stand for a dodecahedral position of the crystal structure, i. where A stands for one or more trivalent rare earth elements, ii. where A' stands for one or more alkaline earth elements, iii. where A'' stands for one or more alkaline metal elements other than Li, and iv. wherein $0 \le a' \le 2$ and $0 \le a'' \le 1$;

b. where B, B', and B'' stand for an octahedral position of the crystal structure, i. where B stands for one or more tetravalent elements, ii. where B' stands for one or more pentavalent elements, iii. where B'' stands for one or more hexavalent elements, and iv. wherein $0 \le b'$, $0 \le b''$, and $b'+b'' \le 2$;

c. where C' and C'' stand for a tetrahedral position of the crystal structure, i. where C' stands for one or more of Al, Ga, and boron, ii. where C'' stands for one or more of Si and Ge, and iii. wherein $0 \le c' \le 0.5$ and $0 \le c'' \le 0.4$; and d. wherein $n=7+a'+2 \cdot a''-b'-2 \cdot b''-3 \cdot c'-4 \cdot c''$ and $4.5 \le n \le 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_1-xAl_xGe_{2-x}(PO_4)_3$), LATP ($Li_1+xAl_x Ti_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials with the general formula: formula $Li_{12-m-x}(M_mY_4^{2-})Y_{2-x}^{2-}X_x^-$ with $M^{m+}=Si^{4+}$, $Ge^{4+}$, $P^{5+}$, $As^{5+}$; $Y^{2-}=O^{2-}$, $S^{2-}$, $Se^{2-}$, $Te^{2-}$, $X^-=Cl^-$, $Br^-$, $I^-$, $0 \le x \le 2$.

A solid-state electrolyte may be in the form of, but not limited to, a dense ceramic membrane, powder, thin film, or thin film composite.

The present disclosure relates to the nature of the solid-state electrolyte used during storage and transportation.

The present description relates to a solid-state electrolyte in the form of a dense ceramic membrane.

A dense ceramic membrane may be defined as, but not limited to, a solid-state electrolyte that has been pressed and densified by calcination or sintering.

A dense ceramic membrane may be in the shape of, but not limited to, a disk, pellet, planar, rectangular, or square.

The thickness of the ceramic membrane may be in the range of $0.01 < t < 2000$ μm.

The surface area of the dense ceramic membrane may be in the range of $0.5 < a < 10000$ cm$^2$.

The dense ceramic membrane may either be freestanding or supported on a porous scaffold.

A dense ceramic membrane may be electrically conductive, semi electrically conductive or non-electrically conductive.

A dense ceramic membrane may have a low porosity, may be >5% or more.

A dense ceramic membrane is preferably to be a continuous layer that is flat and uniform as to allow electrical current to distribute evenly.

The present description relates to a solid-state electrolyte in the form of a dense ceramic membrane during storage and transportation.

The dense ceramic membrane is chemically stable with the hydrophobic substances used to protect it.

The dense ceramic membrane is chemically stable in storage and transportation and with the storage and transportation container used.

The present description relates to a solid-state electrolyte in the form of a powder.

A powder may be defined as, but not limited to, a loose powder or a powder pressed into a green body.

The powder may have a particle size in the range of $0.01 < s < 4000$ μm, with a preferred range of $0.1 < s < 100$ μm.

The powder may have a specific surface area of $0.1 < ssa < 1000$ cm$^2$/g.

A green body may be in the shape of, but not limited to, a disk, pellet, planar, rectangular, or square.

The green body may have a low porosity prior to sintering, may be >5% or more.

The thickness of the green body may be in the range of $0.01 < t < 2000$ μm.

The surface area of the green body may be in the range of $0.5 < a < 10000$ cm$^2$.

The present description relates to a solid-state electrolyte in the form of a powder during storage and transportation.

The powder is chemically stable with the hydrophobic substance used to protect it.

The powder is chemically stable in the environment used for packaging.

The powder is chemically stable in the storage and transportation and storage and transportation container.

The powder may need to withstand any applied temperature that it is exposed to during storage or transportation.

The present description relates to a solid-state electrolyte in the form of a thin film.

A thin film may be defined as, but not limited to, a planar shaped solid-state electrolyte with a thickness of $0.01 < t < 1000$ μm, with a preferred thickness of $0.01 < t < 100$ μm.

A thin film may include additives of inorganic or organic substances such as binders, resins, plasticizer, property enhancers.

The surface area of the thin film may be in the range of $0.5 < a < 10000$ cm$^2$.

The thin film may be flexible or rigid.

The thin film may be freestanding or supported on a porous scaffold.

A thin film may be electrically conductive, semi electrically conductive or non-electrically conductive.

A thin film is preferably to be a continuous layer that is flat and uniform as to allow electrical current to distribute evenly.

The present description relates to a solid-state electrolyte in the form of a thin film during storage and transportation.

The thin film is chemically stable with the hydrophobic substance used to protect it.

The thin film is chemically stable in the environment used for packaging.

The thin film may need to withstand any applied temperature that it is exposed to during packaging.

The present description relates to a solid-state electrolyte in the form of a thin film composite.

A thin film composite may be defined as, but not limited to, a solid-state electrolyte embedded within a crosslinked polymer matrix.

A thin film composite has a thickness of $0.01 < t < 1000$ μm, with a preferred thickness of $0.01 < t < 500$ μm.

Polymers for the crosslinked polymer matrix may be ionic conducting polymers or nonionic conducting polymers.

Examples of polymers included, but not limited to, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly (pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

A thin film composite may include ionic conducting salts. Examples of ionic conducting salts may include, but not limited to, lithium bis(trifluoromethanesulfonyl)imide, lithium bis(trifluoromethane-sulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluro(oxalato) borate (Mg(DFOB)$_2$), Mg(SCN)$_2$, MgBr$_2$, MgI$_2$, Mg (ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

A thin film composite may include inorganic additives. Examples of inorganic additives may include, but not limited to, alumina, titania or zirconia.

The surface area of the thin film composite may be in the range of $0.1 < a < 100,000$ cm$^2$.

The thin film composite may be flexible or rigid.

The thin film composite may be freestanding or supported on a porous scaffold.

A thin film composite may be electrically conductive, semi electrically conductive or non-electrically conductive.

A thin film composite is preferably to be a continuous layer that is flat and uniform as to allow electrical current to distribute evenly.

The present description relates to a solid-state electrolyte in the form of a thin film composite during storage and transportation.

The thin film composite is chemically stable with the hydrophobic substance used to protect it.

The thin film composite is chemically stable in the environment used for packaging.

The thin film composite is chemically stable in the storage and transportation and storage and transportation container.

The present disclosure relates to the nature of the hydrophobic substance during storage and transportation.

The substance is in nature hydrophobic and protects the solid-state electrolyte from moisture and other contaminants during storage and transportation.

A hydrophobic substance includes chemicals and/or materials that are insoluble in water or in any solution that contains a largely aqueous (watery) environment, preferable in which the solubility of water in the hydrophobic substance is preferably less than 10 gram/100 ml.

Examples of the hydrophobic substance may include, but not limited to, synthesized or naturally produced oils, such as mineral oil, baby oil, fish oil, olive oil, canola oil, peanut oil, cooking oil, motor oil and almond oil.

Additional examples of the hydrophobic substance may include, but not limited to, hydrophobic or water insoluble organic solvents such acetone, hexane, toluene, pentane, cyclohexane, heptane, benzene, chlorobenzene, carbon tetrachloride, triethyl amine, o-xylene, p-xylene and m-xylene.

Another examples of the hydrophobic substance may include, but not limited to hydrophobic compound which may be in liquid form when being heated, and become solid under room temperature, such as waxes which can be either natural or synthetic.

The hydrophobic substance is chemically stable with the solid-state electrolyte.

The hydrophobic substance is chemically stable with the storage and transportation container.

The hydrophobic substance is chemically stable in the environment used for packaging.

The hydrophobic substance is stable at any temperatures used in the storage and transportation process.

The hydrophobic substance may be chemically stable in the atmospheric environment.

The hydrophobic substance may be nonhazardous. But some oils and organic solvents may be considered hazardous within reason.

It is preferred that the hydrophobic substance be nonflammable, but some hydrophobic substance used may be flammable within reason.

The hydrophobic substance may be easily removed or evaporated from the solid-state electrolyte as to not affect the ionic conductivity of said solid-state electrolyte. In an example, the hydrophobic substance may be removed after transportation using a compatible organic solvent. Example of compatible solvents include, but not limited to, acetone, hexane, chloroform, etc. In another example, the hydrophobic substance may be removed after transportation by heating.

The organic solvent is chemical stable with the solid-state electrolyte.

The organic solvent may be removed by evaporation or thermal treatment.

Thermal treatment methods are compatible with the solid-state electrolyte with no new reactions that would alter or degrade its properties.

Thermal treatments may be conducted under, but not limited to, atmospheric, inert or vacuum conditions.

The hydrophobic substance may be removed after transportation by thermal treatment without the use of organic solvent.

Thermal treatment methods are compatible with the solid-state electrolyte with no new reactions that would alter or degrade its properties Thermal treatments may be conducted under, but not limited to, atmospheric, inert or vacuum conditions.

The present disclosure relates to the nature of the storage and transportation container used in transportation.

A storage and transportation container can be defined as, but not limited to, a container or vessel which stores or houses the solid-state electrolyte and hydrophobic substance during the storage and transportation process.

A storage and transportation container may include materials such as, but not limited to, plastics, glass, aluminum, polytetrafluoroethylene (e.g., TEFLON), nylon, quartz, wood, and stainless steel.

Types of plastics may include, but not limited to, polyethylene terephthalate (PET), high-density polyethylene (HDPE), polyvinyl chloride (PVC), low-density polyethylene (LDPE), polypropylene (PP), polystyrene (PS), polycarbonate (PC) and Bisphenol A (BPA).

The opening of the storage and transportation container may be sealed using heat, vacuum or an adhesive. Adhesives may include tape, glue or a resin.

In some instances, the storage and transportation container may not have to be sealed tight but rather strapped or sealed down with an adhesive. Adhesives may include tape, glue or a resin.

The storage and transportation container is chemically stable with the solid-state electrolyte.

The storage and transportation container is chemically stable with the protective hydrophobic substance.

The storage and transportation container is stable in the environment used for packaging.

The storage and transportation container is mechanically stable enough to withstand the forces applied during packaging.

The storage and transportation container is stable with any applied temperature used in the packaging process.

The storage and transportation container is mechanically stable enough to withstand any applied forces during storage and transportation within reason.

In some instances, the above-described storage and transportation container may be described as a primary storage and transportation container which is placed inside a larger secondary storage and transportation container.

The secondary storage and transportation container may be filled with hydrophobic substance as to protect the primary storage and transportation container. In other instances, the hydrophobic substance may be used a protectant around the rim of the secondary container.

After storage and/or transportation of the sealed container, the solid state electrolyte may be extracted from the container by positioning the container in a dry atmosphere, unsealing the chamber, and removing the solid state electrolyte from the chamber to the dry atmosphere. Then, the hydrophobic substance may be separated from the solid state electrolyte, such as by heating the solid state electrolyte.

Separation may include burning, volatilization, and/or evaporation of the hydrophobic substance. In the case of mineral oil, burning off of the hydrophobic substance may leave behind a black carbon residue which can be wiped or polished away. In the case of hydrophobic based solvents, volatilization and/or evaporation may be more appropriate.

The evaporation of mineral oil, and other oil-based hydrophobic substances, may leave behind residual carbon on the surface of the solid-state electrolyte indicating a burning of said oil. In this instance, the residual carbon may be removed by methods such as, but not limited to, wiping with a dry towel, polishing with sandpaper, chemically cleaning with another hydrophobic substance such as isopropanol, or a mixture thereof.

On one hand, the heating temperature for burning, volatilization, and/or evaporation of the hydrophobic substance should be sufficiently high enough for the removal of the hydrophobic substance. On the other hand, the heating temperate should be low enough as to not cause structural or material changes to the solid-state electrolyte. For example, if the temperature is too high, lithium may leach out. In this instance, the ionic conductivity will drop significantly. In a preferred aspect, the heating temperature may be limited to a temperature value of 400 degrees Celsius minimize structural or material changes to the solid-state electrolyte. Most hydrophobic substances will be removed in a matter of a minutes at such a temperature. However, mineral oil, and other oil-based hydrophobic substance, may take longer.

The drawings of the present disclosure further describe examples of packaging solid-state electrolytes and their protection using hydrophobic substance and methods of making the same.

FIG. 1: A schematic illustrating the packaging of a solid-state electrolyte in the form of a dense ceramic membrane 002 inside an envelope 004 filled with a protective hydrophobic substance 006 and sealed to form a sealed envelope 008.

Figure 2:
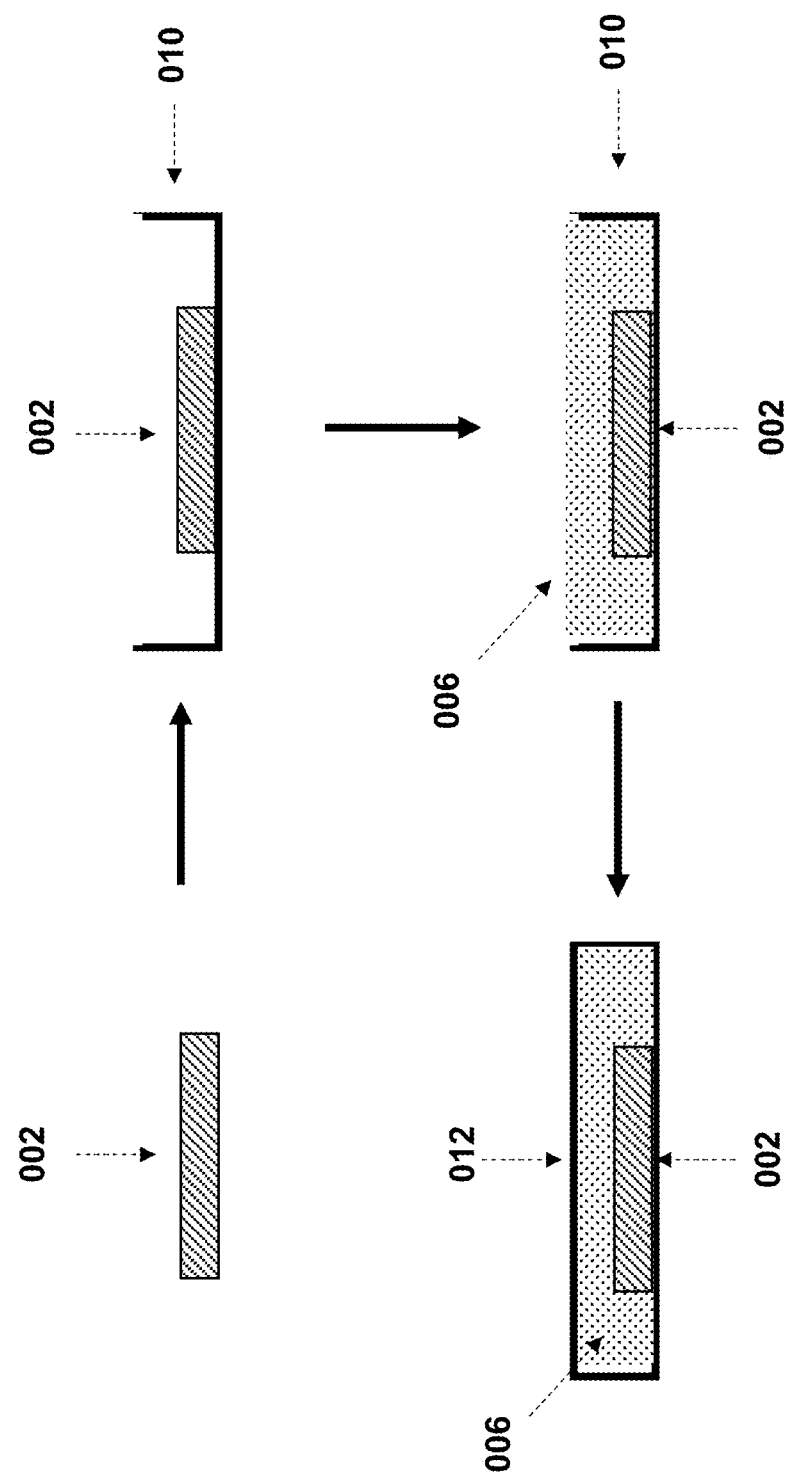
FIG. 2: A schematic illustrating the packaging of a solid-state electrolyte in the form of a dense ceramic membrane inside a container filled with a protective hydrophobic substance.

FIG. 2: A schematic illustrating the packaging of a solid-state electrolyte in the form of a dense ceramic membrane 002 inside a petri dish 110 filled with a protective hydrophobic substance 006 and sealed to form a sealed petri dish 012.

Figure 3:
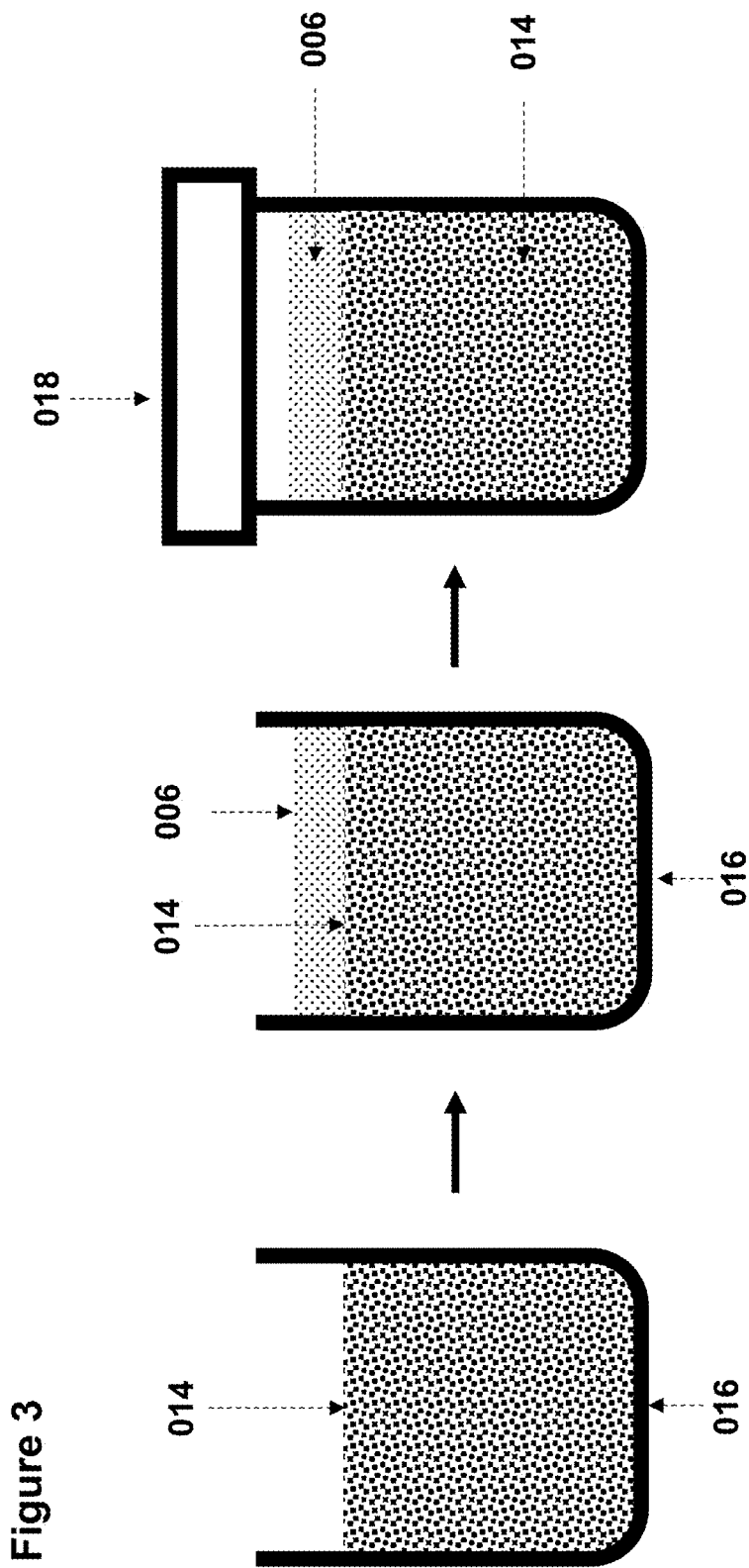
FIG. 3: A schematic illustrating the packaging of a solid-state electrolyte in the form of a powder inside a bottle filled with a protective hydrophobic substance.

FIG. 3: A schematic illustrating the packaging of a solid-state electrolyte in the form of a powder 014 inside a bottle 016 filled with a protective hydrophobic substance 006 and sealed to form a sealed bottle 018.

Figure 4:
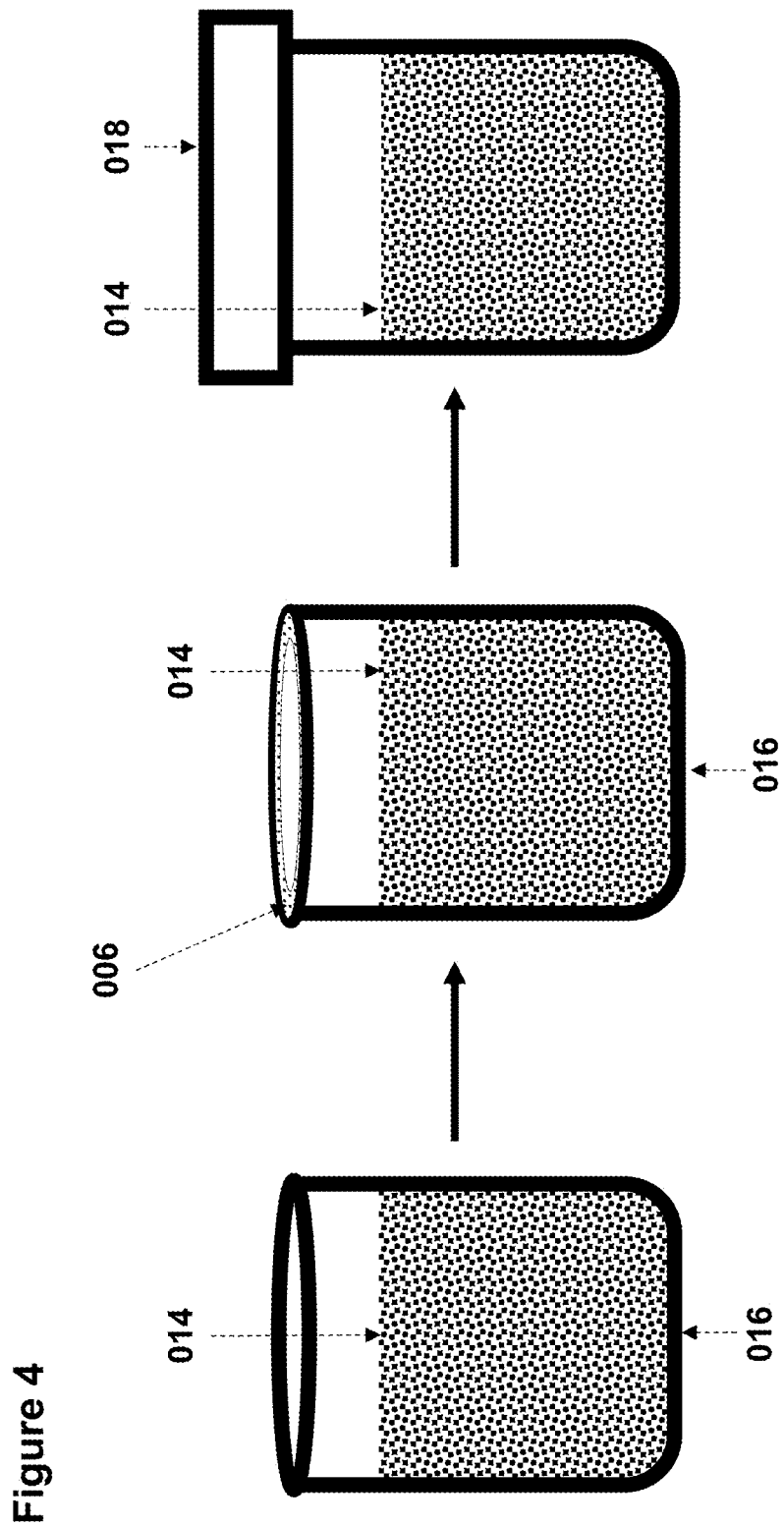
FIG. 4: A schematic illustrating the packaging of a solid-state electrolyte in the form of a powder inside a bottle and hydrophobic substance used as a protectant around the opening.

FIG. 4: A schematic illustrating the packaging of a solid-state electrolyte in the form of a powder 014 inside a bottle 016 and hydrophobic substance 006 used as a protectant around the opening and sealed to form a sealed bottle 018.

Figure 5:
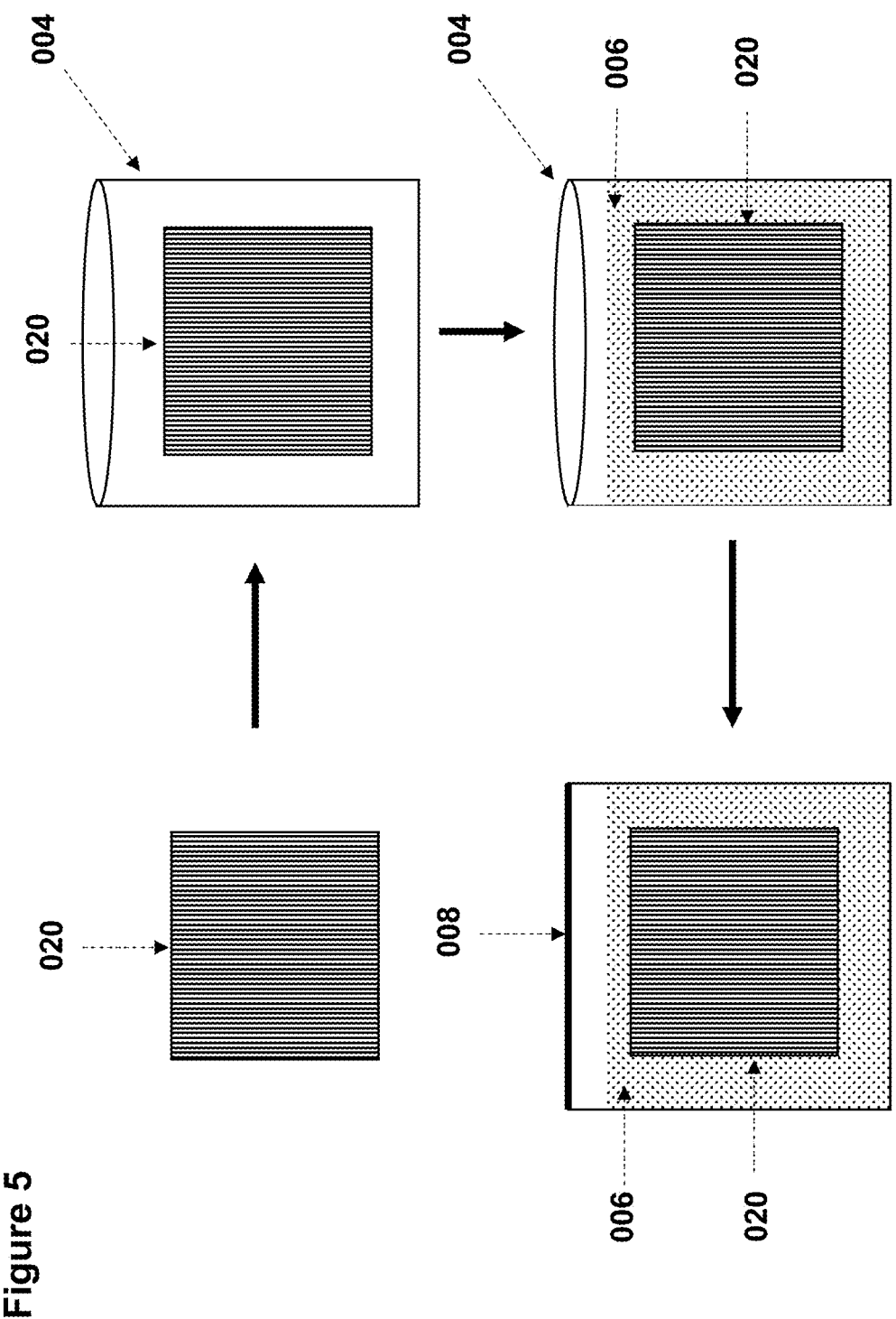
FIG. 5: A schematic illustrating the packaging of a solid-state electrolyte in the form of a thin film or thin film composite inside an envelope filled with hydrophobic substance.

FIG. 5: A schematic illustrating the packaging of a solid-state electrolyte in the form of a thin film or thin film composite 020 inside an envelope 004 filled with hydrophobic substance 006 and sealed to form a sealed envelope 008.

Figure 6:
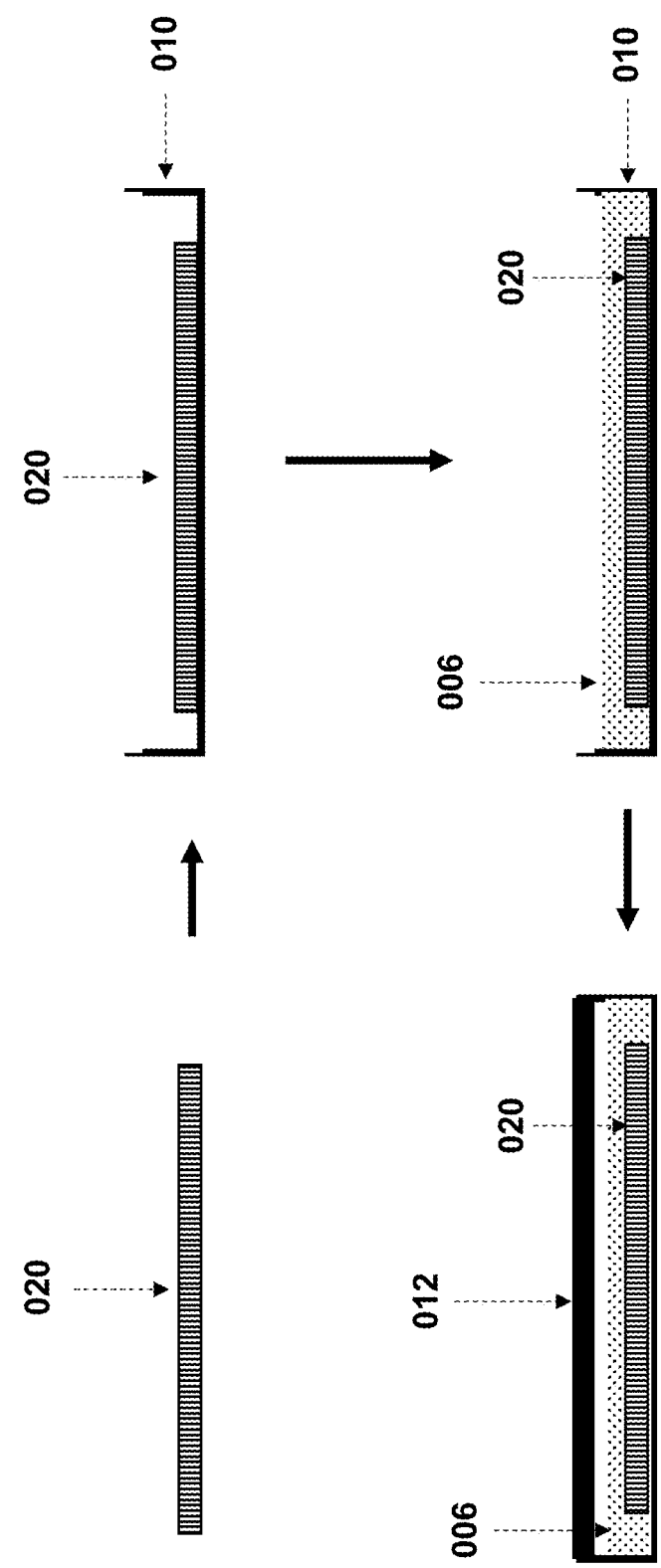
FIG. 6: A schematic illustrating the packaging of a solid-state electrolyte in the form of a thin film or thin film composite inside a container filled with a protective hydrophobic substance.

FIG. 6: A schematic illustrating the packaging of a solid-state electrolyte in the form of a thin film or thin film composite 020 inside a petri dish 010 filled with a protective hydrophobic substance 006 and sealed to form a sealed petri dish 012.

FIG. 7*a*: A schematic illustrating the use of a primary storage and transportation container 022 (e.g. bottle) and a secondary storage and transportation container 024 with hydrophobic substance 006 to protect the primary container with solid-state electrolyte in the form of a powder 014 and sealed to form a sealed secondary storage and transportation container 026.

FIG. 7*b*: A schematic illustrating the use of a primary storage and transportation container 008 (e.g. sealed envelope) and a secondary storage and transportation container 024 with hydrophobic substance 006 to protect the primary storage and transportation container with a solid-state electrolyte in the form of a dense ceramic membrane 002 and sealed to form a sealed secondary storage and transportation container 026.

FIG. 7*c*: A schematic illustrating the use of a primary storage and transportation container 008 (e.g. sealed envelope) and a secondary storage and transportation container 024 with hydrophobic substance 006 to protect the primary storage and transportation container with a solid-state electrolyte in the form of a thin film 020 and sealed to form a sealed secondary storage and transportation container 026.

With reference to the drawings, methods for storage and transportation of the solid-state electrolytes may include one of the following.

In an aspect, a solid-state electrolyte in the form of a dense ceramic membrane may be placed inside an envelope and then filled with hydrophobic substance. The envelope may be completely filled or partially filled with hydrophobic substance. A sufficient amount of hydrophobic substance should be used to protect the dense ceramic membrane. The envelope can be sealed using a heat sealer. Alternatively, a green body may be placed inside in the envelope and methods of the same.

An envelope may consist of, but not limited to, plastic or aluminum.

After opening the envelope, the dense ceramic membrane may be removed and cleaned using acetone. The dense ceramic membrane may be soaked in or sprayed with acetone. After, cleaning the dense ceramic membrane can be allowed to dry.

In an aspect, a solid-state electrolyte in the form of a dense ceramic membrane may be placed inside a dish and then filled with hydrophobic substance. The dish may be completely filled or partially filled with hydrophobic substance. A sufficient amount of hydrophobic substance should be used to protect the dense ceramic membrane. The dish can be sealed using by using a proper lid for said dish. Alternatively, a green body may be placed inside in the dish and methods of the same.

A dish may consist of, but not limited to, plastic, aluminum, polytetrafluoroethylene (e.g., TEFLON), or petri dish.

After opening the dish, the dense ceramic membrane may be removed and cleaned using acetone. The dense ceramic membrane may be soaked in or sprayed with acetone. After cleaning, the dense ceramic membrane can be allowed to dry.

In an aspect, a solid-state electrolyte in the form of a powder may be placed inside a bottle and then filled with hydrophobic substance. The bottle may be completely filled or partially filled with hydrophobic substance. A sufficient amount of hydrophobic substance should be used to protect the powder. The bottle can be sealed using a proper cap for said bottle.

A bottle may consist of, but not limited to, plastic, glass, aluminum, quartz or polytetrafluoroethylene (e.g., TEFLON).

After opening the bottle, the powder may be poured out and allowed to vacuum dry under applied heat for a specific amount of time. Alternatively, the hydrophobic substance may be directly burned off at an elevated but sufficient temperature as to not cause damage to the powder.

In an aspect, a solid-state electrolyte in the form of a powder may be placed inside a bottle with hydrophobic substance placed around the top or opening of said bottle. A sufficient amount of hydrophobic substance should be used to thoroughly seal the opening as to prevent moisture or other contaminants from entering. In this aspect it is preferred that the bottle have a screw on cap or a tight-fitting lid that requires no addition components.

A bottle may consist of, but not limited to, plastic, glass, aluminum, quartz or polytetrafluoroethylene (e.g., TEFLON).

After opening the bottle, the hydrophobic substance may be wiped off using a towel and further cleaned with acetone.

In an aspect, a solid-state electrolyte in the form of a thin film may be placed inside an envelope and then filled with hydrophobic substance. The envelope may be completely filled or partially filled with hydrophobic substance. A sufficient amount of hydrophobic substance should be used to protect the thin film. The envelope can be sealed using a heat sealer. Alternatively, a thin film composite may be placed inside in the envelope and methods of the same.

An envelope may consist of, but not limited to, plastic or aluminum.

After opening the envelope, the thin film may be removed and cleaned using acetone. The thin film may be soaked in or sprayed with acetone. After cleaning, the thin film can be allowed to dry.

In an aspect, a solid-state electrolyte in the form of a thin film may be placed inside a dish and then filled with hydrophobic substance. The dish may be completely filled or partially filled with hydrophobic substance. A sufficient amount of hydrophobic substance should be used to protect the thin film. The dish can be sealed using by using a proper lid for said dish. Alternatively, a thin film composite may be placed inside in the dish and methods of the same.

A dish may consist of, but not limited to, plastic, aluminum, polytetrafluoroethylene (e.g., TEFLON), or petri dish.

After opening the dish, the thin film may be removed and cleaned using acetone. The thin film may be soaked in or sprayed with acetone. After cleaning, the thin film can be allowed to dry.

In an aspect, the primary storage and transportation container containing the solid-state electrolyte may be placed inside a larger secondary storage and transportation container. The secondary storage and transportation container may be completely filled with electrolyte. Alternatively, the opening of the secondary storage and transportation container may be coated with hydrophobic substance and sealed as previously described. In this aspect the primary container may also be completely filled, partially filled, or not filled with hydrophobic substance.

The secondary container is large enough to contain the primary container.

The secondary container and primary container may be of the same or different materials.

Removal of the solid-state electrolyte from the storage and transportation container may include placing the storage and transportation container inside a dry and inert atmosphere, for example $H_2O$ level <5 ppm, such as by way of a glove box, and opening the storage and transportation container within the dry and inert atmosphere.

After the solid-state electrolyte is removed from storage and transportation containers, they may or may not need to be post processed by grinding, polishing or measures of the same to remove surface layers to recover the material properties. In an aspect, the hydrophobic material may be used as a lubricant during post-processing.

In an aspect, before or after optional post-processing, the hydrophobic material may be removed from the solid-state electrolyte, such as by soaking in a solvent (e.g., acetone).

After removal of the solid-state electrolyte from the storage and transportation container and removal of the hydrophobic material from the solid-state electrolyte, if necessary, the solid-state electrolyte may be placed in a sealed container (e.g. bag, jar, etc.) before removing the solid-state electrolyte from the dry and inert atmosphere for further use of the solid-state electrolyte.

The above described methods can be ascribed to the protection of solid-state electrolytes using hydrophobic substance as a protective media from moisture and other contaminates.

The above described methods can be ascribed to the storage and transportation of solid-state electrolytes for both domestic and international purposes.

The above described methods can be ascribed to the storage and transportation of solid-state electrolytes for the purpose of lithium ion or lithium metal battery research and application.

The above described methods can be ascribed to the storage and transportation of solid-state electrolytes for upstream or downstream purposes. Upstream purposes may include, but not limited to, mining or extraction. Downstream purposes may include, but not limited to, recycling.

The above described methods can be ascribed to the storage and transportation of solid-state electrolytes for the end purpose of, but not limited to, academia, national lab, or industry.

Although various embodiments of the disclosed systems and methods have been shown and described, modifications may occur to those skilled in the art upon reading the specification. The present application includes such modifications and is limited only by the scope of the claims.

What is claimed is:

1. A container assembly, comprising:
a container defining a sealed chamber;
a solid state electrolyte disposed in the chamber; and
a hydrophobic substance protecting the solid state electrolyte,
wherein the container comprises a primary container and a secondary container, wherein the solid state electrolyte is disposed in the primary container, and wherein the primary container is disposed in the secondary container, and
wherein the hydrophobic substance is disposed in the secondary container outside of the primary container.

2. The container assembly of claim 1, wherein the solid state electrolyte is in the form of at least one of a membrane, a powder, and a thin film.

3. The container assembly of claim 2, wherein the membrane is a ceramic membrane.

4. The container assembly of claim 2, wherein the thin film is a thin film composite.

5. The container assembly of claim 1, wherein the hydrophobic substance comprises oil.

6. The container assembly of claim 1, wherein the hydrophobic substance comprises at least one organic solvent.

7. The container assembly of claim 1, wherein the hydrophobic substance comprises a hydrophobic compound that is in liquid form when being heated and becomes solid at room temperature.

8. The container assembly of claim 1, wherein the primary container comprises at least one of a dish, a bottle, a jar, an envelope, a bucket, and a drum.

9. The container assembly of claim 1, wherein the secondary container comprises at least one of a dish, a bottle, a jar, an envelope, a bucket, and a drum.

10. The container assembly of claim 1, wherein the primary container comprises at least one of glass, quartz, plastic, metal, ceramic, and wood.

11. The container assembly of claim 10, wherein the plastic comprises at least one of polyethylene terephthalate (PET), high-density polyethylene (HDPE), polyvinyl chloride (PVC), low-density polyethylene (LDPE), polypropylene (PP), polystyrene (PS), polycarbonate (PC), Bisphenol A (BPA), and polytetrafluoroethylene (PTFE).

12. The container assembly of claim 1, wherein the secondary container comprises at least one of glass, quartz, plastic, metal, ceramic, and wood.

13. The container assembly of claim 12, wherein the plastic comprises at least one of polyethylene terephthalate (PET), high-density polyethylene (HDPE), polyvinyl chloride (PVC), low-density polyethylene (LDPE), polypropylene (PP), polystyrene (PS), polycarbonate (PC), Bisphenol A (BPA), and polytetrafluoroethylene (PTFE).

14. A method for extracting the solid state electrolyte from the container assembly of claim 1, the method comprising:
- positioning the container assembly of claim 1 in a dry atmosphere;
- unsealing the chamber; and
- removing the solid state electrolyte from the chamber to the dry atmosphere.

15. The method of claim 14, wherein the dry atmosphere is a dry and inert atmosphere.

16. A method for storing a solid state electrolyte, the method comprising:
- positioning the solid state electrolyte in a chamber of a primary container;
- sealing the chamber;
- positioning the primary container in a secondary container; and
- positioning a hydrophobic substance in the secondary container outside of the primary container.

17. The method of claim 16, further comprising sealing the secondary container.

18. The method of claim 16, further comprising positioning the solid state electrolyte and the primary container in a dry atmosphere before the step of positioning the solid state electrolyte in the chamber of the primary container.

19. The method of claim 18, wherein the dry atmosphere is a dry and inert atmosphere.

20. A container assembly, comprising:
- a container defining a sealed chamber;
- a solid state electrolyte disposed in the chamber; and
- a hydrophobic substance protecting the solid state electrolyte,
- wherein the container comprises a primary container and a secondary container, wherein the solid state electrolyte is disposed in the primary container, and wherein the primary container is disposed in the secondary container, and
- wherein the secondary container further defines an opening, and wherein the hydrophobic substance seals the opening to the secondary container.

* * * * *